UNITED STATES PATENT OFFICE 2,353,247

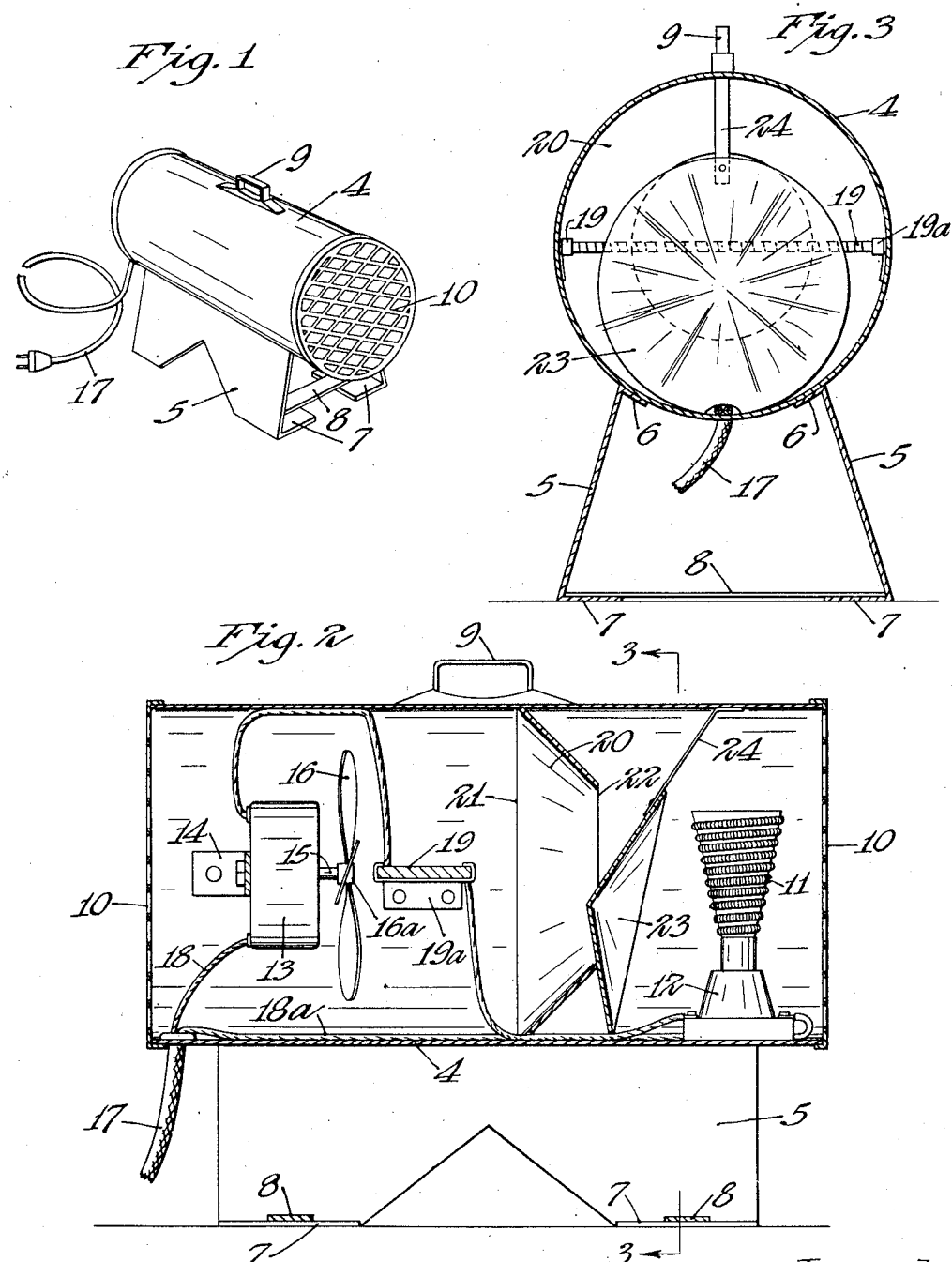

ELECTRIC SPACE HEATER

John J. Kuettel, St. Paul, Minn., assignor of one-half to John M. Lawler, St. Paul, Minn.

Application February 8, 1943, Serial No. 475,099

6 Claims. (Cl. 219—39)

This invention relates to space heaters.

My invention relates more particularly to a space heater wherein a blast of air from an air impeller is directed toward a heating unit so that the air will be properly heated before it flows into a room or similar enclosure.

Experiments were made with a horizontally disposed cylindrical casing having open ends with an electrical heating element in the outlet end of the casing and a radial blade screw-type air impeller adjacent the inlet end of the casing and directed toward the heating unit. It was found that the air screw type of impeller created a certain degree of suction or back pressure adjacent its hub. To overcome this a structure was placed between the impeller and the heating unit to prevent the back flow of air around the hub on the impeller and to concentrate the air flow where it would take up the greatest amount of heat from the heating unit.

One object of my invention as indicated above is to prevent back flow of air adjacent the hub of a radial bladed impeller and to concentrate it where it will be more efficiently heating. Another object of the invention is to so direct the air flow that it will take off heat rising from the heating unit in a horizontal casing so that the upper side of the casing adjacent the heating unit will not become overheated, overheating causing damage to the finish of the casing and also constituting a source of danger to one who might come in contact with the upper portion of the casing over the heating unit.

Still another object of the invention is to provide a forced air flow space heater which utilizes the maximum heat energy with a minimum sized air impeller and heating element.

These and other objects and advantages of the invention will more fully appear from the following description made in connection with the accompanying drawing, wherein like reference characters refer to the same parts throughout the views, and, in which:

Fig. 1 is a perspective view of my heater;

Fig. 2 is an enlarged longitudinal vertical section therethrough; and

Fig. 3 is a transverse section taken approximately on the line 3—3 of Fig. 2.

As shown in the drawing the heater includes a cylindrical horizontally disposed casing 4 which rests upon a pair of leg units 5. The upper ends of the leg units 5 are bent over as at 6 where said units 5 may be suitably secured to the casing 4 as by welding. The lower portions of leg units 5 are bent inwardly toward each other as at 7 and straps 8 connect said lower bent portions 7. A suitable handle 9 is provided at the upper central portion of the casing and the open ends of the casing 4 are provided with protective grills 10.

As viewed in Fig. 2 there is shown an electrical heating unit 11 of frusto-conical shape. The unit 11 is mounted in a conventional socket 12 and is so supported that it is positioned approximately centrally of the longitudinal casing 4 adjacent said right-hand or outlet end of the casing. At the left-hand or inlet end of the casing 4 is an electric motor 13 mounted on a suitable bracket 14, which as shown in Fig. 2, is connected to the inner wall of the casing 4 so that said motor 13 is positioned approximately centrally of the longitudinal casing 4. Upon the motor shaft 15 is mounted a radial bladed fan 16 which is adapted to impel flow of air to form the left-hand or inlet end of the casing 4 toward the heating unit 11 and the right-hand or outlet end of said casing 4. A conduit 17 containing a pair of wires 18 and 18a is suitably connected to the heating element and through the motor 13 and a resistor 19 to the heating element 11. The details of the wiring are not shown since they are conventional. The resistor 19 is mounted on brackets 19a secured at opposite points on the inner wall of the casing 4.

It was found that when the impeller or fan 16 had its flow stream directed toward the heating element 11 in a direct flow relationship there was a loss of heating efficiency. One of the principal reasons for this is that in an impeller of the radial bladed type such as the impeller 16 most of the flow force is exerted by the radial and outer portions of the blades. It was further found that those portions of the impeller 16 adjacent the hub 16a did not serve to force air toward the heating element 11, but on the other hand created a back flow or back pressure which lessened the efficiency of the unit.

In order to overcome difficulties first encountered by flowing the air directly toward the heating element 11 and to prevent back pressures adjacent the hub 16a of the impeller 16 I interposed a baffle in the form of a frustum 20 whose base edge 21 was in contact with the inner wall of the casing 4 and whose open smaller end 22 was disposed toward the heating element 11. The baffle 20 effectively served to converge the flow of air and concentrate its flow toward the heating element 11 and greatly increased the heating capacity of the unit. With the baffle 20 alone, however, is was found that the central portion of the right-hand grill 10 at the outlet end of the casing 4 became overheated, and it was further found that a certain amount of heat arose to the top of the casing 4 above the heating element 11 and excessively heated that portion of said casing. The frusto-conical baffle 23 was then interposed between the baffle 20 and the heating element and held in place by a suitable brace 24. The bottom of the baffle 23 is in contact with the lower portion of the casing 4 and also with the lower portion of the smaller end 22 of the baffle 20. It will be seen in Fig. 2 that baffle 23 is tilted forwardly slightly so that the space between the opening 22 in the baffle 20 and the surface of the baffle 23 increases considerably as the upper portion of said baffle 23 is approached. This causes the main air stream which has been concentrated by the baffle 20 to flow upwardly and over the upper portions of baffle 23, the volume of flow decreasing from the top of said baffle 23 downwardly. While the flow of air through a structure such as shown in the drawing is generally from left to right or from inlet to outlet, it is given a certain turbulence so that all of the air is properly heated by the element 11 and the upper portion of the casing 4 is not undesirably overheated. Excessive heating is also reduced at the baffle 10.

With the structure such as described, it has been found through actual test that there is no back pressure adjacent the hub 16a of the radial bladed impeller 16, and what is more important, considerably more heat is produced than if the baffle structure is not used. Additionally the baffle arrangement is such that the heated air flow is distributed evenly at the outlet or right-hand end of the casing 4 so that the exterior finish of the casing is not harmed. Furthermore, there is no direct blast of air from the impeller 16 toward or past the heating element 11, and the air blast is so controlled that all of it is subjected to the heat generated by the element 11.

It should also be noted that the resistor element 19 is placed at the right-hand or outlet side of the impeller 16 or motor 13. The resistor 19, of course, will to a certain extent preheat the air before it passes the baffles 20, 23 and flows to the heating element 11. The resistor 19 had previously been placed at the left-hand side of the motor 13 as viewed in Fig. 2, but it was found that heat from the resistor was sufficient to cause said motor 13 to become overheated. With the resistor 19 placed as shown in Fig. 2 overheating of the motor was eliminated.

The object in placing the baffle 23 so that the greater part of the air flow is through the upper portion of the casing 4 is to carry off a greater percentage of heat generated by the heating element 11 since the larger portion of the element is toward the larger part of the casing and also because the heat has a natural tendency to rise.

From the foregoing description it will be seen that I have provided an electric space heater with a forced draft which is conveniently mounted in a portable casing so that it can be easily moved and placed in different desired positions and wherein the maximum efficiency is achieved. The baffle structure so affects the air flow from the impeller to the heating unit that the heating efficiency of the structure is quite considerably increased while at the same time heating of the casing 4 is held to a minimum. The device is light in weight and can be easily fabricated so that it is very adaptable to quantity production methods.

It will, of course, be understood that various changes may be made in the form, details, arrangement and proportions of the various parts without departing from the scope of my invention.

What is claimed is:

1. In a space heater, a horizontally elongated casing, a heating unit substantially centrally disposed in an end portion of said casing, an air impeller in said casing and directed toward said heating unit, and a baffle in said casing between said impeller and said heating unit to prevent direct flow of air between the said impeller and said heating unit, said baffle being in substantial engagement with the lower portion of said casing to prevent air flow along said lower portion from said impeller to said heating unit, and said baffle being spaced from the upper inner wall portion of said casing to provide circuitous flow from said impeller and over said baffle to said heating unit.

2. The structure in claim 1, and said baffle being inclined upwardly and forwardly toward said heating unit.

3. In a space heater, a substantially horizontal casing, a heating unit in said casing, an air impeller in said casing and directed toward said heating unit, and a baffle in said casing between said impeller and said heating unit to prevent direct flow of air to said heating unit, said baffle being in substantial engagement with the lower portion of said casing to prevent air flow along said lower portion from said impeller to said heating unit, and said baffle being increasingly spaced from the inner wall of said casing as the top of said casing is approached.

4. In a space heater, an elongated casing, a heating unit in said casing, an air impeller in said casing directed toward said heating unit, air flow concentrating means between said impeller and said heating unit having an air flow outlet directed toward said heating unit, said outlet being located adjacent the longitudinal central portion of said casing, and a baffle between said air flow concentrating means and said heating unit, said baffle being positioned to direct the main air flow stream from said impeller forwardly and upwardly in a circuitous path toward said heating unit.

5. In a space heater, a substantially horizontally elongated casing, a heating unit located adjacent one end of said casing in approximately the center thereof, an air impeller in said casing directed longitudinally thereof toward said heating unit, air concentrating means located between said impeller and said heating unit and comprising a hollow open ended frustum having its base contacting the inner wall of said casing, the smaller end of said frustum being directed toward said heating unit, and a baffle adjacent the smaller end of said frustum and positioned to direct air flow from said smaller end of said frustum circuitously toward said heating unit.

6. In a space heater, a substantially horizontal casing, a heating unit located adjacent one end of said casing in approximately the center thereof, an air impeller in said casing directed longitudinally thereof toward said heating unit, air concentrating means located between said air impeller and said heating unit and comprising a hollow open ended frustum having its base contacting the inner wall of said casing, the smaller end of said frustum being directed toward said heating unit, and a conical baffle between said frustum and said heating unit, said baffle having its apex directed toward the smaller end of said frustum and being slanted forwardly at its upper side, said baffle having a portion below its apex in contact with the smaller end of said frustum and other portions of said conical baffle concentric to said apex and above said substantially contacting portion of said baffle being increasingly spaced from said smaller end of said frustum toward the upper portion of said end of said frustum.

JOHN J. KUETTEL.